United States Patent [19]

Richard et al.

[11] Patent Number: 4,585,384

[45] Date of Patent: Apr. 29, 1986

[54] MULTI-STAGE CONVEYOR SYSTEM

[75] Inventors: Herman Richard, Heusenstamm; Herman Unland, Hofheim; Klaus Ostmann, Darmstadt, all of Fed. Rep. of Germany

[73] Assignee: Hartmann Fördertechnik GmbH, Offenbach, Fed. Rep. of Germany

[21] Appl. No.: 687,187

[22] Filed: Dec. 28, 1984

[30] Foreign Application Priority Data

Jan. 9, 1984 [DE] Fed. Rep. of Germany ....... 3400437

[51] Int. Cl.$^4$ ..................... B65G 15/16; B65G 67/58
[52] U.S. Cl. .................................. 414/139; 198/626; 198/861.3
[58] Field of Search ............... 414/139, 144; 198/509, 198/518, 604, 626, 861.2, 861.3

[56] References Cited

U.S. PATENT DOCUMENTS 4,518,079 5/1985 Paelke ............................. 198/861.2
4,537,302 8/1985 Gsponer et al. ................ 414/139 X

FOREIGN PATENT DOCUMENTS 2813182 10/1979 Fed. Rep. of Germany ...... 414/139
395031 7/1933 United Kingdom ............... 198/626

*Primary Examiner*—Leslie J. Paperner

*Attorney, Agent, or Firm*—Marmorek, Guttman & Rubenstein

[57] ABSTRACT

A multi-stage conveyor system consists essentially of a loading unit for loose material to be conveyed, an elevator unit and a transom unit for conveying the material to a depositing station. When transferring the material from the elevator unit to a delivery branch of a standard belt, abrasive action on the material by throwing the same and the resulting development of dust are avoided. The conveying conditions comprise changing the position of legs defining an opening angle between the elevator unit and the delivery branch. An elevator belt bearing, as receptacles for the material to be conveyed, receptacles such as boxes or chambers passes through the elevator unit and into a terminal branch in a region of changing the direction of belt travel in a bending reach about a central swivel axis. An open side of the chambers on the elevator belt is covered by the standard belt during travel through the elevator unit and the bending reach about the swivel axis. In the bending reach the standard belt takes over the function of conveying the material to the depositing station. A multi-fulcra linkage system has one of its fulcra on the swivel axis, and changing of the configuration of the linkage system causes an angular displacement between the elevator belt terminal branch and the standard belt delivery branch.

12 Claims, 10 Drawing Figures

MULTI-STAGE CONVEYOR SYSTEM

BACKGROUND OF THE INVENTION

This invention relates to a multistage conveying system comprising (A) a loading unit for receiving a material, in particular loose material, to be conveyed from a lower level place of delivery, such as a ship's hold or the like, to a higher level depositing facility, (B) a steeply, in particular a substantially vertically lifting elevator unit, to the lower end of which material is transferred from the loading unit, (C) a depositing transom (or jib) unit for taking up material from the upper end of the elevator unit and transferred to the depositing facility each of the said units having a central longitudinal axis; and the elevator unit comprises (1) an endless elevator belt having an outer elevator belt face and and inner elevator belt face, and (2) a row of material-receiving receptacles, borne between the elevator belt faces, and adapted for being loaded with the material via the outer elevator belt face, the endless elevator belt being adapted for moving through an inner ascending reach and an outer descending reach;

the loading unit, elevator unit and transom unit comprising jointly (a) an endless standard belt having an outer standard belt side and an inner standard belt side, and being adapted for moving through an upper and inner ascending standard belt reach and a lower and outer descending standard belt reach, the said standard belt sealingly covering the outer elevator belt face while passing through the ascending reach in the elevator unit;

(b) angle-adjusting means associated with the elevator unit and the transom unit and adapted for adjusting an angle between the central longitudinal axes of the elevator unit and the transom unit, these angle-adjusting means comprising a position-setting device having an adjustable transverse length and being articulatedly connected with each of the elevator unit and transom unit.

A conveying system of this kind has been described in German Offenlegungsschrift No. 29 30 957, which is an addition to the German patent application No. 27 17 100.2.

More in detail, there is described a band (or belt strap) conveyor for conveying loose material over long distances or great heights, which conveyor consists of an endless conveyor belt supported by rollers which comprises one or several vertical conveyance sectors arranged along the entire conveyor length, in which sectors the transported material is held in place by means of cover belts.

It is a main feature of this German published application that in addition to the vertical conveying sectors, or in their place, one or several nearly horizontally ascending or inclined curved conveyor sectors are employed, and, in one embodiment, conveyance is effected by the upper reach of a conveyor belt, which is first given a trough-shaped cross-section by employing trio groups each of three rollers aligned in a conventional manner, and during advancing conveyance, the lateral slopes of the trough are gradually raised toward a vertical position by a corresponding continously steeper positioning of the two lateral rollers of each successive trio of rollers until they from an angle of 90° with the central roller supporting the bottom of the trough. After accomplished trough-formation with the two lateral rollers of the trio groups along the advancing reach of the cover belt the latter is guided overlappingly over the trough-shaped upper reach of the conveyor belt, and the resulting composite belt is held together by supporting rollers engaging the belt on both sides.

Further features of the system according to this published application comprise the possibility of spiralling the composite belt, which, however, does not concern the present invention.

In a further addition to the last-mentioned German parent application No. 27 17 100.2, which has been published as Offenlegungsschrift No. 30 05 452, there is solved the problem of enabling continued movement of the conveyor, after passthrough a vertical conveying sector, on the next higher conveyance level, at a random angle with the direction in which the lower level supply reach extends. Apart from this feature the above-made remarks concerning German Offenlegungsschrift No. 29 30 957 apply likewise.

The maintenance of the covering of the upper reach of the belt strap conveyor belt by means of the upper reach of the covering band over at least an essential part of its length is a common feature of this group of systems.

Covering of the transom unit for granulated or larger-piece loose material is not required as a rule, and may even be undesirable, as it disturbs the visual control of the conveyance of material in particular in a reach of changing or reversing the direction of conveyance, quite apart from the unnecessary additional structure this would demand.

The conversion of the two belts to trough-shaped cross section ("Aufmuldung") must be considered a further drawback as this does not only require additional work, but also considerably increases the wear of the belts by the constantly re-occurring bending of the marginal belt zones on both sides of the belt.

Furthermore, German Offenlegungsschrift No. 31 45 104 discloses a direction-reversing station comprising vertical and horizontal conveying branch lines, which station consists of an undulated-edge band belt and of a cover belt closing off the former belt.

There are formed at least two conveying sectors one of which is of constant, stationary positioning or of changeable position, relative to the other one. A supporting framework is provided with a supporting roller combination for the conveyor belt as well as for the cover belt which takes into account the angle of the belt reversal.

A critical feature of this system is the formation of carrying stations having adjustable, changeable distances between the shafts of the supporting rollers for the undulated-edge band belt and, arranged on both sides of the first-mentioned roller, the two supporting rollers for the cover belt region.

The distance between the cover belt and the undulated-edge band belt is so adjusted, in principle, that no force-transmitting direct contact is possible between the two belts. Each supporting point comprises three supporting rollers of each of which the first and the second supporting roller are in coaxial arrangement and associated, as a rule, with the cover belt, while the third supporting roller of each trio is associated with the undulated-edge band belt. In the case of the illustrated example, the supporting rollers relating to the cover belt are of changeable positioning, while the supporting rollers relating to the undulated-edge band belt are in fixed position.

Means for adjusting the distancing between the roller shafts engage the movably positioned support means.

The three supporting rollers of each roller group thus have their three axes arranged in a common radial plane, taken with respect to the belt-direction reversal, i.e., the two short rollers support on both sides the edges of the cover belt, while the long roller supports the undulated-edge belt over its entire width.

Means provided for adjusting the positioning of the movably supported rollers comprise a weight-loaded pulling (or tensioning) station acting in the direction of the deflection of a transom unit. However, this station can only adjust the angle of the transom unit with regard to the vertical elevator unit in a movement that does not comprise the spreading or reverse closing of two legs, but the angle of relative positioning of two units is adjusted merely by moving a single leg. This has the drawback of reducing the possibilities of manipulating the conveyor system.

OBJECT AND SUMMARY OF THE INVENTION

Taking into account this state of the art, it is an object of the invention to provide a multi-stage conveyor system of the initially described type which enables the transfer of a loose material or the like to be conveyed, from a steeply ascending elevator unit to a transom unit which is articulatedly connected with the elevator unit, while avoiding at least substantially any abraisive treatment of the material, in particular as caused by throwing the same, and eliminating as far as possible the development of dust during such transfer.

It is another object of the invention, alone or in combination with the first-mentioned object, to increase the possible aperture of the opening angle between the elevator unit and the transom unit during any required changes of said angle, while maintaining the conveying process without interruption and under the above-mentioned conveying conditions, and without any subsequent tensioning of the material-delivering elevator belt and/or the material-receiving belt which further transports the material to the depositing station, while carrying out the required changes of the positions of the two legs enclosing the opening angle between them, thereby achieving an improved adaptation to the prevailing conditions of operations.

These objects are attained in accordance with the invention by providing a multistage conveyor system of the initially described type which further comprises (c) a head station between the upper end of the elevator unit and the adjoining transom unit, (d) direction-changing swivel means between the elevator unit and the transom unit, in the head station, these swivel means being adapted for carrying out a swivelling action, and having a swivel axis extending transversely relative to the central longitudinal axis of the elevator unit and the transom unit;

(e) means for operational drive of the elevator belt and the standard belt in the same sense in the inner ascending reaches thereof in the elevator unit and head station, and for synchronous speed thereof, at parallel poaitioning of the ascending reaches of the two belts, the distance between the outer face and outer side, respectively, of the two belts in the ascending reaches in the elevator unit and head station thereof being such as to correspond to the height of the receptacles and thereby to cover the receptacles sealingly by the outer face of the standard belt;

the elevator belt moving about the direction-changing swivel means in the head station and through an adjoining part of the transom unit above the outer side of the endless standard belt in the upper reach thereof passing through the last-mentioned unit;

the standard belt outer side in the inner ascending and upper reach thereof remaining in convering contact with the outer elevator belt face in the ascending reach thereof over the arc of a segment of the swivelling action of the direction-changing swivel means and, in the remaining portion of the swivelling action, detaching itself from the elevator belt and continuing conveyance of the material toward the depositing facility; and (f) a terminal branch of the elevator belt comprising belt-reversing means and extending from the head station onto the transom unit, and adapted for having the lower reach thereof lifted upwardly off the upper reach of the standard belt in the transom unit, thereby opening the receptacles for emptying the material therefrom on to the upper reach of the standard belt, and (g) the direction changing swivel means comprise a multi-articulated linkage system for angular adjustment of the elevator belt and its terminal branch relative to each other between adjacent reaches thereof in the head station.

By this novel arrangement, the use of a relatively complicated elevator belt equipped with receptacle chambers is essentially limited to the steeply conveying elevator unit, and the standard belt which in the ascending reach covers the receptacles, will change its function and become the material-transporting belt in the transom unit.

The material-receiving and holding chambers thus empty within the region of the change of the direction of the elevator belt, by being lifted gently off the covering standard belt, whereby there will be avoided an abrupt emptying and the development of dust accompanying the same.

By maintaining these receptacle chambers covered by the standard belt through a sufficiently long arc of the direction-changing movement, there will be prevented a flow of the material in rearward direction between the elevator belt and the convering belt, and additional waste, that would be caused thereby, will be avoided, and a favorable degree of conveying efficiency will be attained.

In order to optimize the transfer process of material from the elevator unit to the transom unit, it is recommended that an opening angle is provided between the terminal branch of the receptacle-equipped elevator belt therein, which branch is guided by a direction-reversing and driving drum, on the one hand, and the material-carrying delivery branch of the standard belt in the transom unit, and that this opening angle is maintained by the fixed position, in the elevator unit, of a fulcrum for the operation of a spreading leg means, in particular a parallelogram or rhomb system, connected with the central swivel axis, and of the latter axis with the bearing of a reversing and drive drum of the standard belt delivery branch, whereby the opening angle is unchangeably defined.

Owing to the pre-adjusted opening angle which need amount to only relatively few degrees, between the lower straight reach of the terminal branch of the elevator belt before making central contact with the driving and reversing drum in the terminal reach, on the one hand, and the upper delivery branch reach of the standard belt in the same unit, on the other hand, there is achieved a continuous release of material from the chambers or the like receptacles of the elevator belt over a predetermined length of travel, so that the transfer of material from the chambers of the elevator belt to the standard belt does not occur in full chamber loads, but in smaller portions.

Thereby, the conveyor system according to the invention is particularly well suited for the conveyance of fine-gained material, as the successive, gradual emptying of the receptacle chambers further diminishes the development of dust.

A preferred embodiment of the multi-articulated device for adjusting the opening angle between the elevator unit and the transom unit comprises the feature that the central swivel shaft which is fixedly arranged in the head station constitutes one fulcrum in a four-fulcra, especially a parallelogram or rhomb system, while the other three points of articulation are devised, starting from the central swivel shaft in clockwise direction, to form a rhomb, and one fulcrum which is connected via the spreadable stays with the swivel shaft, is arranged in fixed position in the elevator unit, and, another via a further spreading stay, is in fixed position relative to the shaft of the driving and reversing drum which is located at the end of the terminal portion of the elevator belt in the transom unit, and that, when changing the opening angle between the elevator unit and the transom unit by means of the position-setting device, the distance between the central swivel shaft and the diametrically opposite fulcrum in the four-fulcra linkage system, which diametrically opposite fulcrum points toward the middle of the curved segment of the reversed, descending reach of the elevator belt, increases when the opening angle is enlarged, and decreases when that opening angle is diminished, and that the said diametrically opposite fulcrum defines simultaneously the location of the shaft of a central supporting roller and of two carrier frames in which the two ends of the said central supporting roller shaft are held, which carrier frames also bear further supporting rollers for the said curved segment of the elevator belt.

The use of the preferred four-fulcra linkage system cooperating with the position-setting device, which can be, for instance, a hoisting cylinder, makes possible not only the adjustment of the aforesaid opening angle by synchronous shifting of the two legs enclosing that angle, but, in connection with the aforesaid opposite fulcrum at the joint of the rhombic quadrilateral pointing toward the middle of the curved segment of the reversed, descending reach of the elevator belt, which fulcrum is of changeable position and coincides with the shaft of a supporting roller, further supporting rollers being associated with the aforesaid roller, all of which rolles are mounted in two frames on opposite sides of said curved elevator belt segment and conforming with the configuration of the latter. This permits a supporting guidance of the elevator belt through the direction-changing travel path of this belt which is determined by the size of the opening angle.

In order to define the range of the belt direction change and the belt location in this range, as well as the guidance of both belts in curved segments with pedetermined radii about the central swivel shaft, it is necessary (1) that the range of belt direction change, in the case of the upper reach of the elevator belt is limited, on the one hand, by the possibility of shifting the position of its driving and reversing drum and, on the other hand, by the shiftability of the guiding stub shaft and supporting rollers in the head station, (2) that the belt position, within these limitations, is determined by the positioning of the multi-stage linkage system, and (3) that the receptacles or chambers in the ascending reach of the elevator belt—as far as it is not part of the terminal reach thereof in the transom unit—are in contact with the reach of the standard belt which is sliding upon the supporting rollers which are disposed equidistantly about the central swivel axis.

With regard to the arrangement and mounting of the supporting rollers which are required for effecting the change of direction of belt travel in the head station and in the elevator tower, respectively, in particular in the case of the ascending reach of the elevator belt, it is recommended (i) that the ascending reach of the elevator belt is guided by supporting rollers mounted in a carrier, as well as by rollers which are movably guided in rails that are mounted in the head station and extend about a part of the curved segment and into the linear belt stretch in the adjoining part of the transom unit, these rails thus comprising an arcuate entry portion adapted to the radius of the direction change of the ascending reach of the belt, which arcuate entry portion extends over an arc of about 60 degrees, and connecting member adapted for articulatedly connecting the last-mentioned movable rollers with the first one of the adjoining fixedly mounted rollers, and that, depending on the size of the opening angle between the elevator unit and the transom unit, in the case of a large angle, a large number of the fixedly mounted rollers enters the rail, and, in the case of a small angle, at least a part of the last mentioned rollers have exited from the rail, while the movable rollers remain in the rail.

This embodiment guarantees a secure guidance of the ascending reach of the elevator belt independently of the size of the opening angle between the elevator unit and the transom unit.

As far as the guidance and change of direction of the standard belt is concerned, it is recommended that the standard belt being supported on direction-changing rollers arranged on a uniform radius is in contact with snub pulleys, one of which is provided in the elevator unit and a second one in the transom unit, which snub pulleys tangentially contact the standard web, with the sum of the envolving angles of the upper reach and the lower reach being constant at each angle adjustment.

A preferred choice in selecting an elevator belt is a belt carrying box-type receptacles which comprise successively arranged rectangular individual chambers which are oriented transverse to the direction of travel of a belt of such determined width that, to the right and to the left thereof, there remain supporting margins enabling engagement by, or resting on, supporting stub rollers.

BRIEF DESCRIPTION OF THE DRAWINGS

Other object and details of the multi-stage conveyor system according to the invention will become apparent from the further description thereof in relation to the accompanying drawings in which.

DETAILED DESCRIPTION OF THE EMBODIMENTS SHOWN IN THE DRAWINGS

Figure 1:
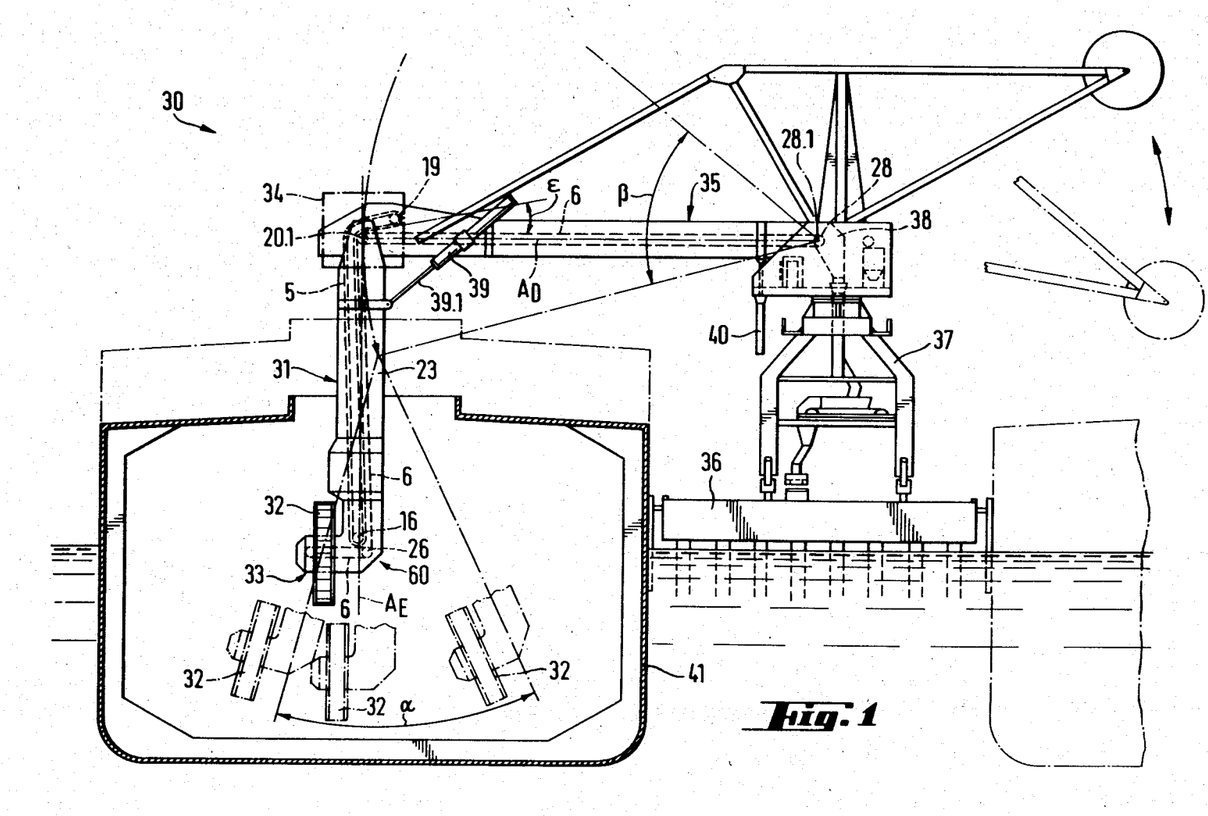
FIG. 1 is a schematical overview of a preferred embodiment of the conveyor system according to the invention as employed in a ship-unloading system.

The embodiment of the multi-stage conveyor system 30 shown in FIG. 1 illustrates the use of the system as a ship-unloading installation, which comprises an scoop wheel 32 for feeding the loose material in the ship's hull 41 on to a receptacles-bearing elevator belt 31 comprising receptacles, e.g. boxes or chambers, 50 in an elevator unit 31; the elevator belt lifts off in a region at the upper end of the elevator tower 23 from a jib branch 6.3,6.4 of an endless standard belt 6 in the transom unit 35, in which the standard belt reaches 6.3 and 6.4 extend either horizontally or upwardly or downwardly inclined, whereupon the direction of movement of the standard belt 6 is reversed by a driving and reversing drum 28 and subsequently arranged direction-changing rollers 11 and 12 so that the standard belt returns to the foot of the elevator tower 23. The jib or delivery branch 6.3,6.4 of the endless standard belt 6 in the transom unit 35 is connected with the elevator unit 31 for being swivelled, from a horizontal to an upwardly or downwardly inclined position, about a swivel shaft 20 which is at the junction of the elevator unit 31 and the transom unit 35, while the free end of the delivery branch 6.3,6.4 is adapted to cooperate with a materials-depositing station, e.g. a transportable silo installation 37 which is carried on rails on the pier 36.

As shown in FIG. 1 the conveyor system 30 according to the invention is particularly suited for the unloading of loose material from the hold 41 of a vessel such as a ship or barge. The elevator belt 5 is fed via the horizontal uptake jib branch 33 of the standard belt 6 extending at right angle to the elevator tower 23 and onto which loose material is loaded by means of the scoop wheel 32, whereupon the material is transferred from the outer surface 6a of the upper reach 6.1 of the standard belt 6 to the interior of the boxes or chambers 50 of the elevator belt 5, which receptacles have openings in the outer surface 5a of the elevator belt 5. This transfer occurs in the region 60 in which the travel of the belt 5 is reversed by means of a reversing drum 16. The direction of travel of the belt 6 is changed by 90 degrees, this change being effected by means of the direction-changing and reversing drum 16, the returning reach 6.5 of the belt 6 being deflected by 90° with the aid of the direction-changing roller 26, to enter the reach 6.6. The travel of the belt 6 in the jib unit 33 is then reversed to turn from the lower reach 6.6 into the upper reach 6.1, by means of the reversing drum 27.

At the lowest position of the belt 5 on the roller 16, one of the boxes or chambers 50' is about to cover completely a portion of loose material carried on the top surface of the upper reach 6.1 of the belt 6 and the next preceding box chamber 50" contains a similar portion of material sealingly enclosed in that chamber by the belt 6 which has entered its ascending reach 6.2.

The reach 5.2 of the surface 5a of the elevator belt 5 is sealingly covered by the outer surface 6a of the standard belt 6 during the entire upward concurrent travel of the two belts through the reaches 5.2 and 6.2 in the elevator unit 31.

In a head station 34 at the upper end of the elevator tower 23, the belt 5 will be lifted off the belt 6, whereby the receptacle-bearing belt 5 enters into a position in which it leaves the loose material from its chambers 50 deposited on the upper surface 6a of the reach 6.3 thereof. The angle $\epsilon$ between the outer surface 5a of the reach 5.3 of the elevator belt 5, on the one hand, and the upper surface 6a of the standard belt 6 in the reach 6.3, on the other hand, can be adjusted within certain limits by means of the lifting cylinder 39 which is mounted in the transom unit 35, the apex of the angle $\epsilon$ being located above the fulcrum 20.1 of the swivel shaft 20.

The pivotable transom unit 35 is adjoined to a head station 34, and the latter contains the swivel shaft 20 bearing the necessary guiding means for changing the directions of travel of the belts 5 and 6.

The transom unit is extended to the transortable silo installation 37 on the pier 36, and the angle $\beta$ between the material-discharging terminal reach 6.3,6.4 of the belt 6 whose central axis passes through the shaft 28.1 of the drive and reversing drum 28, on the one hand, and the central axis of the hopper 38, on the other hand, can be adjusted by means of a lifting device 40 which is mounted, for instance, on a platform of the silo installation 37.

The possibilities of adjusting an angle $\alpha$ between central longitudinal axis of the elevator unit 31 and that of the transom unit 35, as well as the angle $\beta$ between the central longitudinal axis of the terminal reach 6.3,6.4 of the belt 6 in the transom unit 35 and the axis of the hopper 38, with the apex of the angle $\beta$ being located on the drum shaft 28.1, enables an additional possibilities of pivotal adjustment of the three stages in the multi-stage conveyor system 30, whereby the lower end of the elevator unit 31 and the scoop wheel 32 connected therewith can be displaced inside the ship's hull 41, as indicated in phantom lines in FIG. 1.

Figure 2:
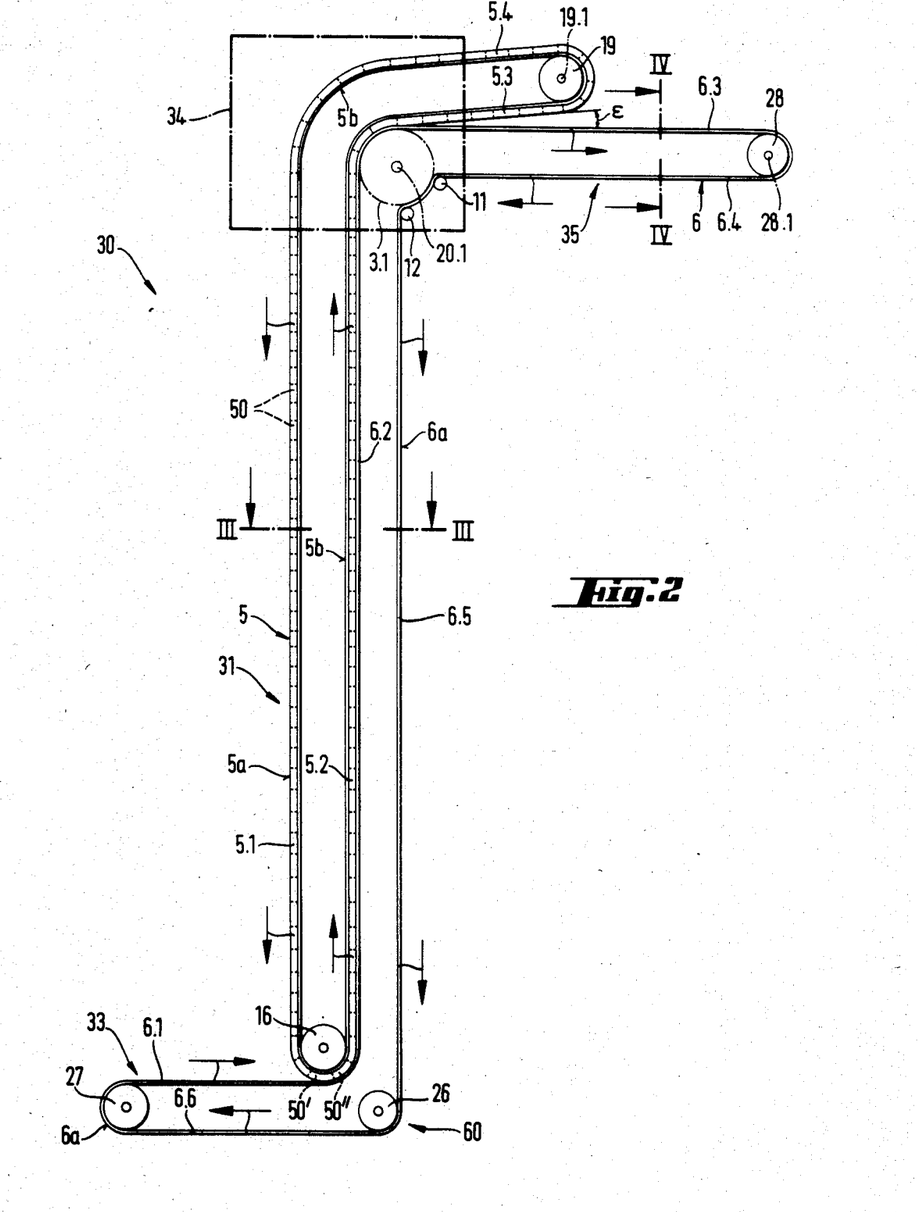
FIG. 2 is a schematical representation of the embodiment shown in FIG. 1 with more details and on a larger scale.

A preferred arrangement of the three stages of the conveyor system 30, in which the vertically and horizontally arranged stages have together the shape of a S is illustrated schematically in FIG. 2.

Figure 3:
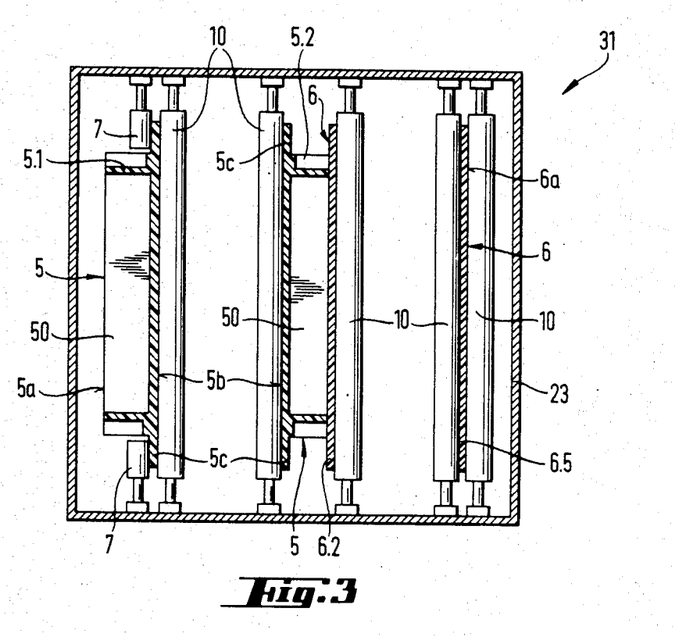
FIG. 3 shows in schematic representation a cross sectional view of a part of the same embodiment taken in a plane indicated by III—III in FIG. 2.

FIG. 3 shows in the middle of the cross-sectional view the chamber-bearing belt 5 ascending vertically upwardly through the reach 5.2 while its material-filled chambers are sealingly covered on the outer face 5a thereof by the belt 6 ascending at the same linear speed through the reach 6.2 thereof. Both belts 5 and 6 are held in sealing contact with each other by supporting rollers 10.

To the left in FIG. 3, the descending belt 5 with empty chambers 50 is shown guided by stubble rollers 7 and supporting rollers 10 extending across the entire width of the belt 5 and beyond the marginal zones of the latter.

In the right hand part of FIG. 3, a pair of supporting rollers 10 guides the belt 6 alone during its downward travel through the reach 6.5 thereof.

The shafts of the rollers 7 and 10 are mounted in bearings in the opposite walls of the elevator tower 23.

This guidance of the belts 5 and 6 within the elevator tower 23 of the elevator unit 31 provides an exact sealing effect between the two belts in the ascending reach and thus an optimal effectivity of the upward conveyance of the loaded material.

Figure 4:
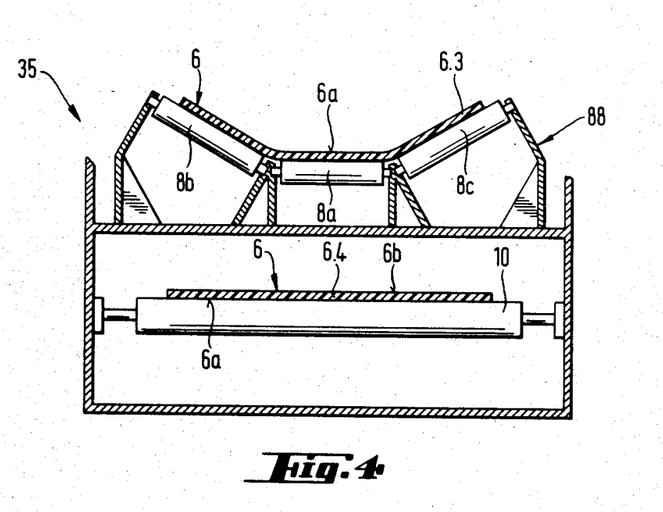
FIG. 4 shows schematically another cross-sectional view of the same embodiment taken in a plane indicated by IV—IV in FIG. 2.

FIG. 4 is a cross-sectional view of the delivery branch of the standard belt 6 extending through the reaches 6.3,6.4 thereof in the transom unit 35, in which these reaches as illustrated extend substantially horizontally (FIG. 2).

The upper reach 6.3 of the belt 6 is shown passing through a band station 88 comprising a central supporting roller 8a and two tray-forming rollers 8b,8c deflecting the marginal zones of the belt 6 in the reach 6.3 to have the belt 6 adopt the cross section of a tray. The lower reach 6.4 in the delivery branch of the belt 6 is supported on a supporting roller 10.

Figure 5:
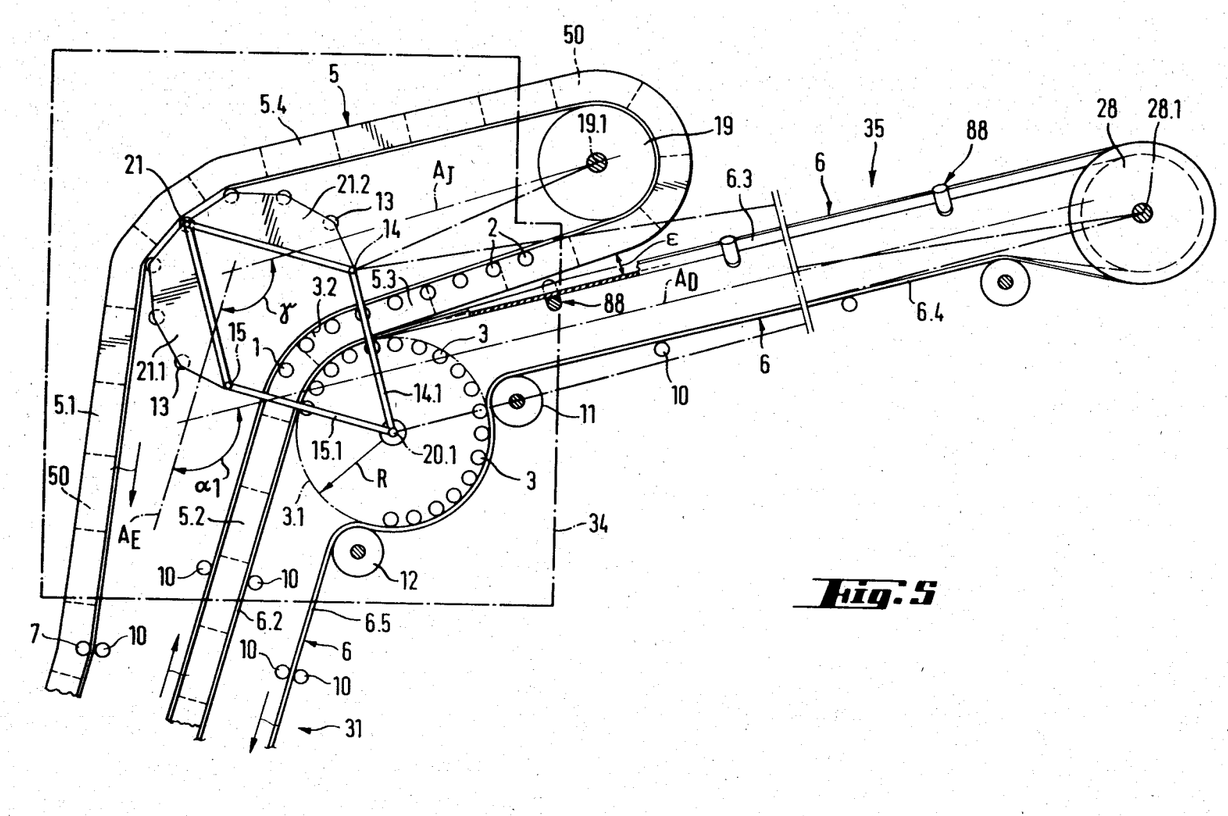
FIG. 5 shows schematically the upper portion of the embodiment shown in FIG. 2 with a first embodiment of a head-station for changing the direction of travel of an elevator belt and a standard belt therein under a first deflecting angle.
Figure 6:
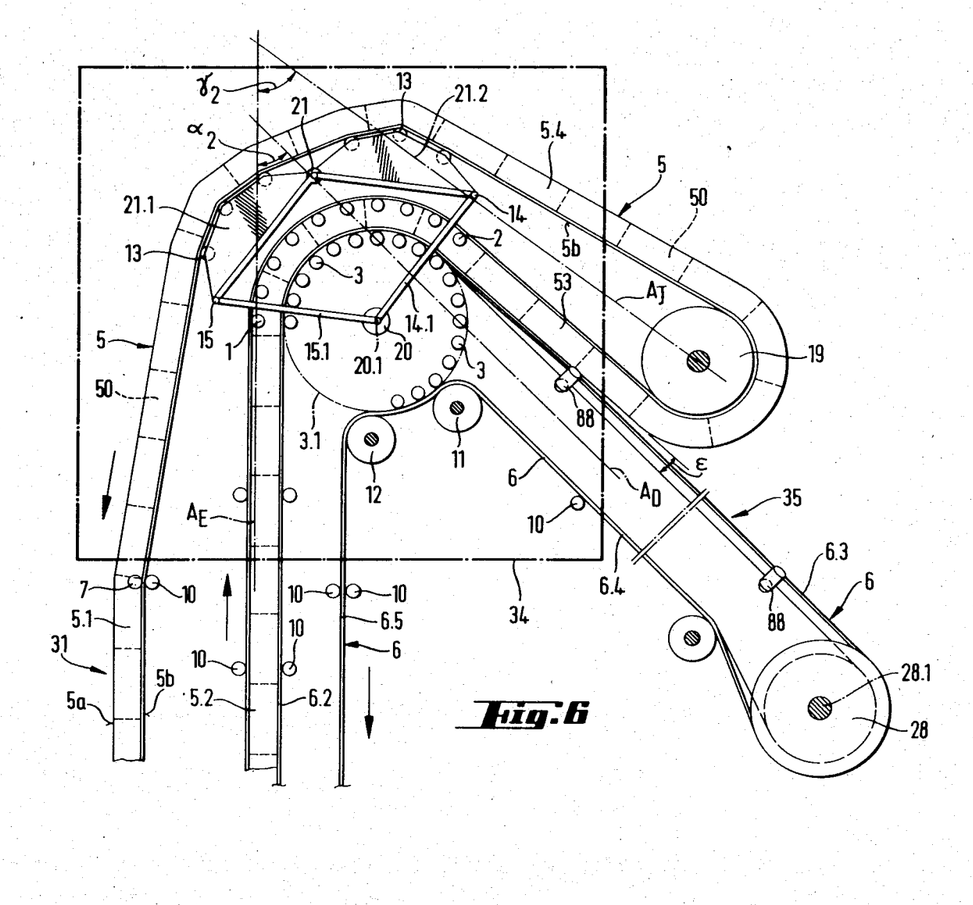
FIG. 6 shows schematically the same parts as FIG. 5, but under a different deflecting angle of the two belts.

FIGS. 5 and 6 show the region of the conveyor belt system according to the invention in which the elevator unit 31 and the transom unit 35 merge, and in which region the ascending or descending belts 5 and 6 passing through must be deflected by having their direction of travel changed from a substantially vertical to a substantially horizontal direction of travel involving a direction change of about 90°, or a direction change by a somewhat smaller angle, from the vertical, or by an angle larger than 90°.

FIG. 5 shows the aforesaid merging region of the elevator and transom units in a case in which the angle $\alpha$ of deflection taken between a longitudinal axis $A_E$ of the elevator tower and a central longitudinal axis $A_D$ of the delivery branch 6.3,6.4 of the belt 6 in the transom unit, 35, which axis is taken as the longitudinal axis of the latter unit, amounts to about $\alpha_1=120$ degrees. The direction-changing means required in the aforesaid merging region are mounted in a head station 34 at the upper end of the elevator tower 23.

These direction-changing means comprise a number of carrier rollers 3 which are arranged on the inner periphery of a circle 3.1 about a swivel shaft 20 and cooperate with snub pulleys 11 and 12 in controlling the return path traveled by the belt 6 through a lower segment of the circle of rollers 3 in the head station 34 when passing from the lower delivery branch reach 6.4 in the transom unit 35 to the descending branch 6.5 in the elevator unit 31. At the same time, the belt 6 in the range passing from the ascending reach 6.2 to the upper delivery branch reach 6.3 is carried about the said inner circle 3.1 on top of the rollers 3 thereof in an upper circle arc.

In the embodiment shown in FIG. 5 the rollers 3 are distributed along the circle 3.1 about an angle of approximately 260 degrees.

A second outer circle 3.2, about the swivel shaft 20 as its center, of a radius larger by the height of the chambers 50, taken transverse to the direction of their travel on belt 5, defines the position of a smaller number of fixed supporting rollers 1 which are rotatably mounted within bearings stationary between opposite sidewalls of the head station 34. These rollers 1 are preferably stub rollers which support the chamber-bearing band 5b of the belt 5 during the direction-changing travel of the belt 5 coming from the belt reach 5.2, in which the belt 5 is supported by similar stub rollers 7, and passing through the head station 34 toward the lower reach 5.3 of the belt 5 in a jib branch thereof in the transom unit 35.

While in the British patent specification No. 395,031, the jib branch 5.3,5.4 of the belt 5 has its lower reach 5.3 remain in contact with the underlying upper reach 6.3 of the delivery branch of the belt 6, it is an important feature of the novel conveyor system according to the invention that the free end of the jib branch of the belt 5 can be tilted slightly upwardly so that the central jib branch axis $A_J$ which passes through the shaft of the reversing drum 19 at the free end of the jib branch 5.3,5.4 will intersect the central longitudinal axis $A_E$ of the elevator unit 31 by an angle $\gamma$ being a few degrees larger than the above-mentioned angle $\alpha_1$.

Thereby, in the position of parts illustrated in FIG. 5, there is a small opening angle $\epsilon$ formed between the outer surface 5a of the lower reach 5.3 of the belt 5 and the outer face 6a of the upper reach 6.3 of the belt 6, in transom unit 35. The advantages resulting from the formation of this small angle $\epsilon$ resulting from the differences of the angles of inclination of the jib branch of the belt 5 and the delivery branch of the belt 6 relative to the central longitudinal axis $A_E$ of the elevator unit have been explained hereinbefore.

As mentioned in describing FIG. 1, the angle $\alpha$ can be adjusted by means of a lifting cylinder 39 whose piston 39.1 is mounted pivotably on the elevator tower 23 while the cylinder is pivotally connected on frame means for the delivery branch of the belt 6 in the transom unit 35.

In FIG. 6, the angle $\alpha$ between the central delivery branch axis $A_D$ of the belt 6 and the above-mentioned elevator unit axis $A_E$ amounts to $\alpha_2=45°$.

The angles $\alpha_2=45°$ and $\alpha_1=120°$ represent limit positions of the inclination of the delivery branch of the belt 6 because at smaller or larger angles $\alpha$ there is danger that loose material will start sliding along the upper reach 6.3 of the belt 6, rearwardly if the angle $\alpha$ is further increased, and forwardly toward the hopper 38, if the angle $\alpha$ is decreased below 45°, depending, of course on other factors such as the humidity of the conveyed material.

One difficulty occurring in the head station when changing the direction of travel, in particular, of the receptacles-bearing belt 5 is the fact that, due to that change of direction about the angle $\gamma$, the length of the belt 5 available to travel through the reaches 5.4 and 5.1 which must always be larger than the length of the belt 5 passing through the reaches 5.2 and 5.3 thereof, will not be constant, as it would be if the angle $\gamma$ were always constant, but will change depending on the size of the angle $\gamma$. Thus, in the case of the angle $\gamma$ being equal $(120+\epsilon)°$ there will be more slack to be compensated for while in the case of it being equal $(45+\epsilon)°$ there will be very little slack.

In the case of the standard belt 6 such slack can be compensated for in a conventional manner by a tensioning roller 29 or the like. However, in the case of the receptacles-bearing belt 5 in which the receptacles are boxes, chambers or the like of considerable height, special slack-compensating means are provided for in the head station 34, in accordance with the invention. These slack-compensating means comprise a multi-fulcra, especially a four-fulcra linkage system, with a parallelogram or rhomb system being preferred because of easy construction and manipulation. One fulcrum 20.1 of this parallelogram or rhomb system is located in the swivel shaft 20 on which the link rods 14.1 and 15.1 are articulatedly mounted. At their free ends 14 and 15 these links bear joints constituting two further fulcra at which the link members 21.2 and 21.1 are articulatedly mounted, respectively, and the latter two links are connected with each other at their ends remote from the fulcra 14 and 15, by means of a fourth articulated joint 21. The link members 21.1 and 21.2 are devised as pairs of roller-supporting frame shields between each of which there is mounted a number of supporting rollers 13, of which three are shown in each frame shield, while a central roller is mounted at the common articulated joint 21 of the two link members, which joint 21 is diametrically opposite the swivel shaft 20 in the parallelogram or rhomb system.

At the larger angle $\gamma$, shown in FIG. 5, i.e. an upwardly pointing leg of the angle $\gamma$ constituted by the longitudinal axis $A_J$ of the jib branch of the elevator belt 5, resulting in more slack in the reaches 5.4 and 5.1 thereof, the rhombic linkage system between the fulcra at 20.1 and 21 thereof must be stretched whereby the link members 21.1 and 21.2 form a narrower angle at the fulcrum at 21 and the central roller 21 at this fulcrum pushes the descending, slackened belt 5, passing from its reach 5.4 into its reach 5.1, outwardly away from the swivel shaft 20 and the fulcrum 20.1, thereby tensioning the belt 5 in this region of the head station 34 and only supporting it on the rollers 13 nearest the central roller 21.

At the same time, the articulated joint 15 is in fixed relationship with the upper end of the elevator tower 23, or a framework (not shown) supporting the belt 5 in the reaches 5.1 and 5.2 therein, while the articulated joint 14 is in fixed relationship with a framework (not shown) of the transom unit 35 that also bears the shaft 19.1 of the reversing drum 19 so as to provide a fixed distance between the fulcrum 14 and the shaft 19.1. As the fulcrum 14 is kept at a fixed distance from the shivel shaft 20 by the link rod 14.1, shortening of the distance between the opposite fulcra 20.1 and 21, with fulcrum 15 and thereby the link 15.1 connecting the same with the swivel shaft 20 in a fixed relationship with the elevator tower 23 will move the fulcrum at the articulated joint 14 more to the right and downward in clockwise rotation about the swivel shaft 20 guided by the link rod 14.1.

The fixed connection between the articulated joint 14 and the reversing drum shaft 19.1 forces the latter to follow this clockwise movement of the joint 14, only in a swivel movement of larger radius, until jib branch of the belt 5 has assumed the position shown in FIG. 6. In the resulting position of all parts, there is much less slack of the belt 5 to be taken up and the link member 21.1 and 21.2 are spread much further apart than in FIG. 5, the central roller at the fulcrum 21 having been withdrawn inwardly out of contact with the inner surface 5b of the belt 5 in the upper reach 5.4 of the latter passing through the head station 34. All three rollers 13 of the link member 21.2 now support the belt 5 in the reach 5.4 inside the head station 34, and all of the rollers 13 of the link member 21.1 now support the belt 5 in the bend thereof passing from the reach 5.4 into the descending reach 5.1, and out of the head station 34 downwardly into the elevator tower 23.

In normal operation, the spreading of the link rods 14.1 and 15.1 and the resulting shortening of the diametrical distance between fulcra 20.1 and 21 in the linkage system lowering the jib branch of the belt 5 together with its reversing drum 19 in clockwise rotation about the swivel axis 20 will be accompanied by a corresponding displacement of the piston in the lifting cylinder 39, whereby the delivery branch of the belt 6 and the reversing drum 28 therein will also be rotated clockwise about the swivel shaft 20 to an extent such that the angle $\epsilon$ between the upper reach 6.3 of the belt 6 and the lower reach 5.3 of the belt 5 will remain the same as in FIG. 5.

Preferably the distance of the supporting rollers 3 at the periphery of the circle 3.1 corresponds to an angle of about 15 degrees, and the angle of deflection about the circle 3.1 of the upper reach 6.3 from the ascending reach 6.2, on the one hand, is preferably the same as the angle of deflection between the lower reach 6.4 and the descending reach 6.5 of the belt 6, regardless of the angle of inclination $\alpha$ between the elevator unit axis $A_E$ and the axis $A_D$ of the delivery branch of belt 6.

Figure 7:
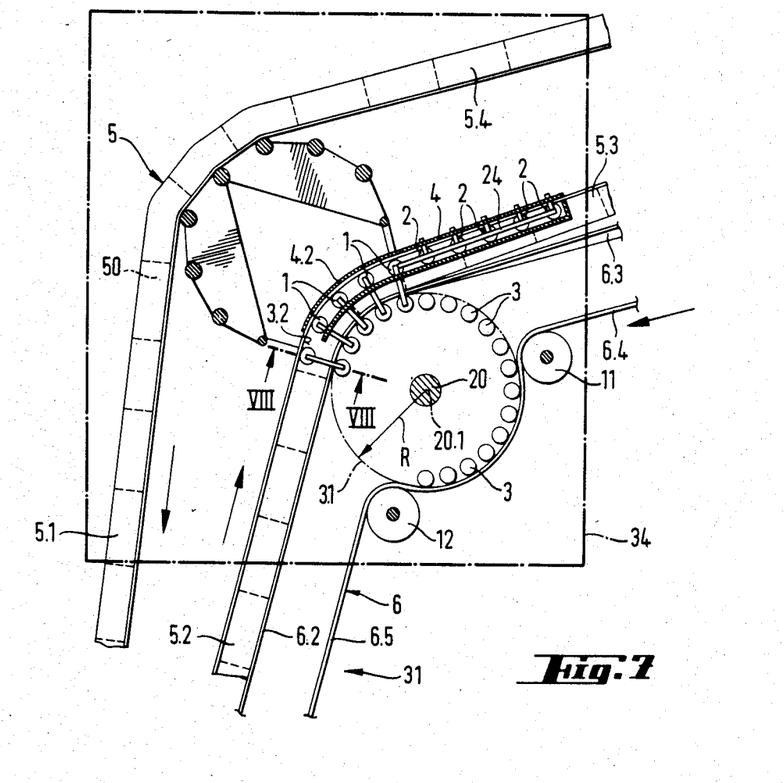
FIG. 7 shows schematically a similar head station as in FIG. 5, but with slightly different details.
Figure 9:
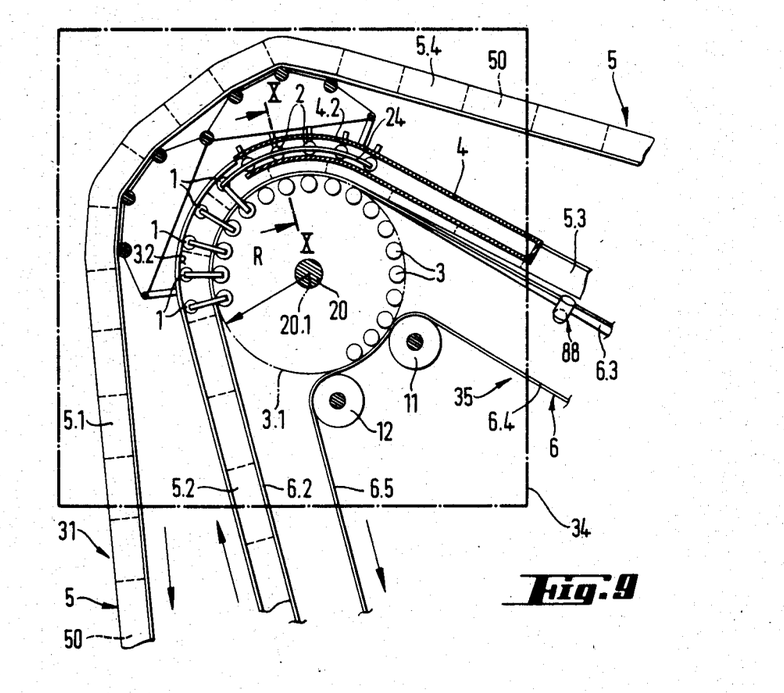
FIG. 9 shows the same embodiment of a head station as in FIG. 7, but under a different angle of deflection similar to that shown in FIG. 6.

The FIGS. 7 and 9 correspond to FIGS. 5 and 6, but there is shown only an arrangement of position-fixed supporting rollers 1 and movable supporting rollers 2 engaged by the receptacles-bearing belt 5 in the bending region of travel through the head station 34 from the ascending reach 5.2 in the elevator unit 31 toward the straight lower reach 5.3 of the jib branch of the belt 5 in the transom unit 35.

For the sake of clarity, the detailed illustration of the supporting rollers of the bending region of the belt 5 from the upper reach 5.4 toward the descending reach 5.1 thereof as well as all the supporting rollers 3 of the upper reach 6.3 of the belt 6 except one in the circle 3.1 about the swivel shaft 20 have been omitted.

In FIG. 7, the angle $\alpha$ is smaller than the corresponding angle $\alpha$ in FIG. 5 while the angles $\gamma$ in the two figures are about the same, whereby the opening angle $\epsilon$ in FIG. 7 is somewhat larger than in FIG. 5.

Figure 8:
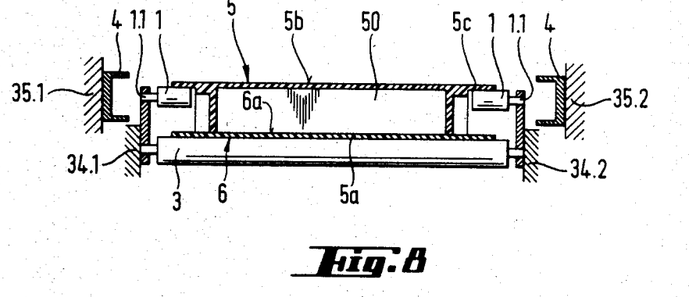
FIG. 8 shows schematically a portion of the embodiment shown in FIG. 7 in a cross-sectional view taken therein in a plane indicated by VIII—VIII.

In the embodiment of FIG. 7 the arrangement of the supporting stub rollers 1 in a circular segment parallel to the circle 3.1 having the radius R about the swivel shaft 20 comprises guiding bearings 1.1 for these stub rollers 1 mounted in opposite sidewalls 34.1 and 34.2 of the head station 34 as schematically indicated in FIG. 8. The shafts of the supporting rollers 2 as well as the uppermost fixed stub roller 1, i.e. the last one in the direction of travel of the belt 5 are interconnected by interspace holding members 24. The rails 4 have a straight part articulatedly mounted in opposite slewable sidewalls 35.1 and 35.2 of the jib branch of belt 5 in the transom unit 35 in the head station 34, in which the supporting rollers 2 are rotatably mounted. The sidewalls 35.1 and 35.2 together with the rollers 2 mounted therein can thus be slewed upwardly or downwardly so as to increase or decrease the opening angle ε between the lower, reach 5.3 of the upwardly travelling belt 5 and the upper reach 6.3 of the belt 6, thereby permitting the discharge of material from the chambers 50 of the belt 5 on to the belt 6 therebelow.

FIG. 9 shows the same embodiment as FIG. 7 but with an angle of deflection α of 45 degrees instead of about 120 degrees, and a correspondingly somewhat larger angle γ of (45+ε) degrees only, between the central axis $A_E$ and the longitudinal axis $A_D$ of the delivery branch of the belt 6.

As can be seen by a comparison of FIGS. 7 and 9, a decrease of the angle γ in the case of FIG. 9 causes the fixedly mounted supporting rollers 1 to leave the curved parts 4.2 of the rails 4.

FIG. 8 shows the arrangement of the supporting stub rollers 1 in the rails 4 which are mounted in the slewable sidewalls 35.1 and 35.2 of the transom unit 35 and support the marginal zones 5c of the wall at the inner surface 5b (FIG. 2) of the receptacles-bearing belt 5, while the supporting rollers 3 still hold the belt 6 in sealing contact with the open sides 5a of the chambers 50 in the face of the belt 5.

Figure 10:
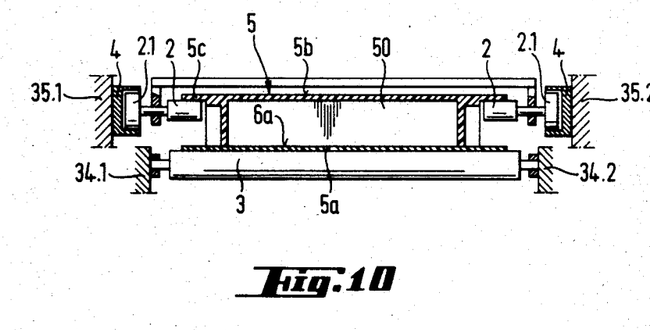
FIG. 10 shows schematically a portion of the embodiment shown in FIG. 9, in a cross-sectional view taken therein in a plane indicated by X—X.

FIG. 10 shows that the very similar arrangement of the supporting rollers in FIG. 9 in the plane of this cross-sectional view is substantially the same as in FIGS. 5 and 8. In FIG. 10, the shafts of the stub rollers 2 are borne in the rails 4 with the aid of rollers 2.1.

We claim:

1. A multi-stage conveying system comprising
   (A) a loading unit for receiving a material to be conveyed from a lower level place of delivery, such as a ship's hold or the like, to a higher level depositing facility,
   (B) a steeply lifting elevator unit, to the lower end of which material is transferred from said loading unit,
   (C) a depositing transom unit for taking up material from the upper end of said elevator unit and transferred to said depositing facility,
   each of said units having a central longitudinal axis; wherein
   said elevator unit comprises
   (1) an endless elevator belt having an outer elevator belt face and an inner elevator belt face, and
   (2) a row of material-receiving receptacles, borne between said elevator belt faces, and adapted for being loaded with said material via said outer elevator belt face,
   said endless elevator belt being adapted for moving through an inner ascending reach and an outer descending reach in said elevator unit; and through a terminal branch in said transom unit and joined at an angle to the upper ends of said ascending and descending reaches,
   (a) an endless standard belt having an outer standard belt side and an inner standard belt side, and being adapted for moving through an inner ascending standard belt reach and an outer descending standard belt reach in said elevator unit, and through a delivery branch joined at an angle to the upper ends of said elevator belt reaches in said elevator unit,
   said inner reach of said standard belt sealingly covering said outer elevator belt face of said inner ascending reach of said elevator belt in said elevator unit;
   (b) angle-adjusting means associated with said elevator unit and said standard belt delivery branch in said transom unit and adapted for adjusting an angle between said central longitudinal axis of said elevator unit and of said delivery branch in said transom unit, said angle-adjusting means comprising a position-setting device having an adjustable transverse length and being articulatedly connected with each of said elevator unit and transom unit,
   (c) a head station between the upper end of said elevator unit and the adjoining transom unit, and
   (d) direction-changing swivel means in said head station between said elevator unit and said transom unit, said swivel means being adapted for carrying out a swivelling action of said terminal branch of said elevator belt relative to said elevator unit and having a swivel axis extending transversely relative to said central longitudinal axes of said elevator unit and said elevator belt terminal branch;
   (e) means for operational drive of said elevator belt and said standard belt in the same sense in said inner ascending reaches thereof in said elevator unit and head station, and for synchronous speed thereof, at parallel positioning of said ascending reaches of said two belts,
   the distance between said inner face and outer side, respectively, of said two belts in said ascending reaches in said elevator unit and head station thereof being such as to correspond to the height of said receptacles and thereby to cover said receptacles sealingly by said outer side of said standard belt;
   said elevator belt moving about said direction-changing swivel means in said head station and through an adjoining part of said transom unit above said outer side of said endless standard belt in the upper reach thereof passing through said last-mentioned unit;
   said standard belt outer side in said ascending reach thereof remaining in covering contact with said outer elevator belt face in said ascending reach thereof over the arc of a segment of said swivelling action of said direction changing swivel means and, in the remaining portion of said swivelling action, detaching itself from said elevator belt and continuing conveyance of said material toward said depositing facility; and
   (f) said terminal elevator belt branch comprising belt-reversing means and extending from said head station into said transom unit, and adapted for having a lower reach thereof lifted upwardly off said upper reach of said standard belt delivery branch in said transom unit, thereby opening said receptacles for emptying the material therefrom onto said upper reach of said standard belt, and
   (g) said direction-changing swivel means in said head station and said angle-adjusting means being adapted for a cooperation such that a lower reach of said terminal elevator belt branch is lifted off by a determined small opening angle from an upper reach of said standard belt delivery branch, thereby opening said receptacles of said elevator belt at their lower face for discharge of material therefrom on to said delivery branch.

2. The conveyor system of claim 1, wherein said belt-reversing means of said terminal elevator belt branch comprise a direction-reversing drum and a drum shaft thereof, said direction-changing swivel means comprising a first fulcrum on said swivel axis, a second fulcrum and a third fulcrum in said multi-fulcra linkage system, as well as a first rigid link member connecting said first and second fulcra with each other, first connecting means for maintaining a constant distance between said drum shaft and said second fulcrum, and second connecting means for maintaining a constant distance between said first fulcrum on said swivel axis and said third fulcrum being in fixed position in said elevator unit, whereby rotary displacement of said second fulcrum relative to said swivel axis changes the angle between said central longitudinal axes of said elevator unit and of said elevator belt terminal branch.

3. The conveyor system of claim 2, wherein said direction-changing swivel means comprise further a fourth fulcrum, a third rigid link member connecting said fourth fulcrum with said second fulcrum, and a fourth rigid link member connecting said third fulcrum with said fourth fulcrum, while said second link member connects said first fulcrum on said swivel axis with said third fulcrum, said first, second, third and fourth link members being of such lengths that said fourth fulcrum is located diametrically opposite said first fulcrum on said swivel axis, in said head station, and wherein said third fulcrum is at a fixed relationship relative to said central longitudinal axis of said elevator unit.

4. The conveyor system of claim 3, wherein changing of the positions of said first, second, third and fourth link members relative to each other increasing the diametrical distance between said first and fourth fulcrum causes an increase of the angle enclosed between the central longitudinal axis of the elevator unit and the central longitudinal axis of said elevator belt terminal branch, while shortening said diametrical distance decreases the last-mentioned angle.

5. The conveyor system of claim 4, wherein said multi-fulcra linkage system is a rhombic or parallelogram linkage system.

6. The conveyor system of claim 4, wherein said direction-changing swivel means comprises guide frame members mounted on the sides of said third and fourth link members, respectively, facing away from said swivel axis, and supporting rollers mounted in curved arrangement in said guide frame members and engaging the inner elevator belt face in an outer bent reach from the terminal branch in said head station toward the descending reach of said elevator belt through said elevator unit, within said head station, whereby increasing the diametrical distance between said swivel axis and said fourth fulcrum tensions said bent elevator belt reach compensating any slack in said elevator belt.

7. The conveyor system of claim 6, wherein said third and fourth link members are of equal length and are spread apart, when said diametrical distance of said fourth fulcrum from said swivel axis is shortened, and are with their free ends bearing the second and third fulcrum, respectively, closer together, when said diametrical distance is increased, those supporting rollers in the vicinity of the fourth fulcrum supporting the inner elevator belt side in the last-mentioned case, thus determining the travel path of the elevator belt through said outer bent reach thereof in said head station.

8. The conveyor system of claim 7, comprising secondary supporting rollers for an inner bent reach of said elevator belt in said head station, arranged in a substantially circular arc about said swivel axis and adapted for engaging the inner face of said standard belt and for supporting the receptacles of said elevator belt being sealingly closed by said standard belt in said head station.

9. The conveyor system of claim 8, wherein said elevator belt comprises a substantially closed base band at the inner face thereof, and tertiary supporting rollers arranged in said head station in a curved section about said swivel axis at a larger radius than said circular arc, and a fourth series of supporting rollers extending, away from the last tertiary roller at the end of said curved section near said transom unit, toward said reversing drum of said terminal elevator belt branch, and guide and carrier means comprising a curved guide entry section for mounting and a straight guide section connected therewith in said terminal elevator belt branch, said tertiary supporting rollers and said fourth series of supporting rollers being rotatably mounted in said guide means for supporting said base bend of said elevator belt while passing through said head station.

10. The conveyor system of claim 9, wherein said guide and carrier means comprise guide rail means mounted firmly in a region extending from said elevator unit into said head station, and mounted movably together with said terminal branch of said elevator belt, said curved guide entry section thereof extending over an arc of an angle of about 60 degrees for receiving therein tertiary and fourth series supporting rollers, and roller-connecting means for articulatedly connecting the tertiary supporting roller nearest said transom unit as well as said supporting rollers of said fourth series with one another, in an arrangement such that, upon setting a large angle between the central longitudinal axes of said elevator unit and of said terminal elevator belt branch at least a major number of the tertiary supporting rollers and all of the fourth series of supporting rollers enter said guide rail means and, when setting a smaller angle as defined, at least a considerable number of said tertiary supporting rollers exit from said guide rail means while said fourth supporting roller series remain therein.

11. The conveyor system of claim 10, wherein said head station comprises two tensioning rollers, a number of said secondary rollers arranged on said circular arc in the region thereof facing away from said elevator belt, being adapted for guidingly engaging the inner side of said standard belt traveling through a bending reach thereof from said depositing branch back to said descending reach thereof in said elevator unit, said tensioning rollers being arranged to engage the outer side of said standard belt, one of said tensioning rollers where said standard belt enters said bending reach and the other where said standard belt leaves said bending reach, so that the sum of the envolving arcs of the inner and outer sides of said standard belt engaging said circularly arranged supporting rollers above and below said swivel axis is constant at each angle between the central longitudinal axes of said elevator unit and standard belt delivery branch.

12. The conveyor system of claim 9, wherein said closed base band of said elevator belt projects beyond the receptacles thereon along opposite marginal sides of said elevator belt by a sufficient width to be adapted for engagement by supporting stub rollers to be disposed laterally of said row of chambers.

* * * * *